United States Patent [19]

Kew

[11] 4,145,041
[45] Mar. 20, 1979

[54] AUTOMATIC DOCUMENT HANDLING APPARATUS

[75] Inventor: Jeffrey Kew, Upton St. Leonards, England

[73] Assignee: Xerox Corporation, Stamford, Conn.

[21] Appl. No.: 780,882

[22] Filed: Mar. 24, 1977

[30] Foreign Application Priority Data

Jun. 25, 1976 [GB] United Kingdom ............... 26582/76

[51] Int. Cl.² .................. B65H 9/04; B65H 5/02; B65H 29/20
[52] U.S. Cl. .................................... 271/233; 271/80; 271/188; 271/275; 271/DIG. 3
[58] Field of Search ................. 271/275, 233, 80, 69, 271/188, 4, DIG. 9, 184, 272, 273, 3, 6, 7, 10, 245, 246, 208, DIG. 3, DIG. 2; 355/75, 76

[56] References Cited

U.S. PATENT DOCUMENTS

| | | | |
|---|---|---|---|
| 3,229,608 | 1/1966 | Staub et al. | 271/272 X |
| 3,506,257 | 4/1970 | Fackler et al. | 271/4 X |
| 3,565,420 | 2/1971 | Howard | 271/4 |
| 3,620,615 | 11/1971 | Volkers | 271/DIG. 2 |
| 3,844,552 | 10/1974 | Bleau et al. | 271/246 X |
| 4,043,550 | 8/1977 | Phillips et al. | 271/233 |

*Primary Examiner*—Bruce H. Stoner, Jr.

[57] ABSTRACT

A document handling apparatus in which sheets are automatically moved in sequence into a registered position on a work surface and then moved out of that position to make way for the next sheet is disclosed. The apparatus includes a document driving belt extending across a surface between first and second edges thereof, a reversible drive for selectively driving the belt in one direction towards the second surface edge and in the opposite direction, a pair of document driving rotary members flanking the belt adjacent the second edge of the surface, and a clutch arrangement for driving said members in said one direction only.

5 Claims, 6 Drawing Figures

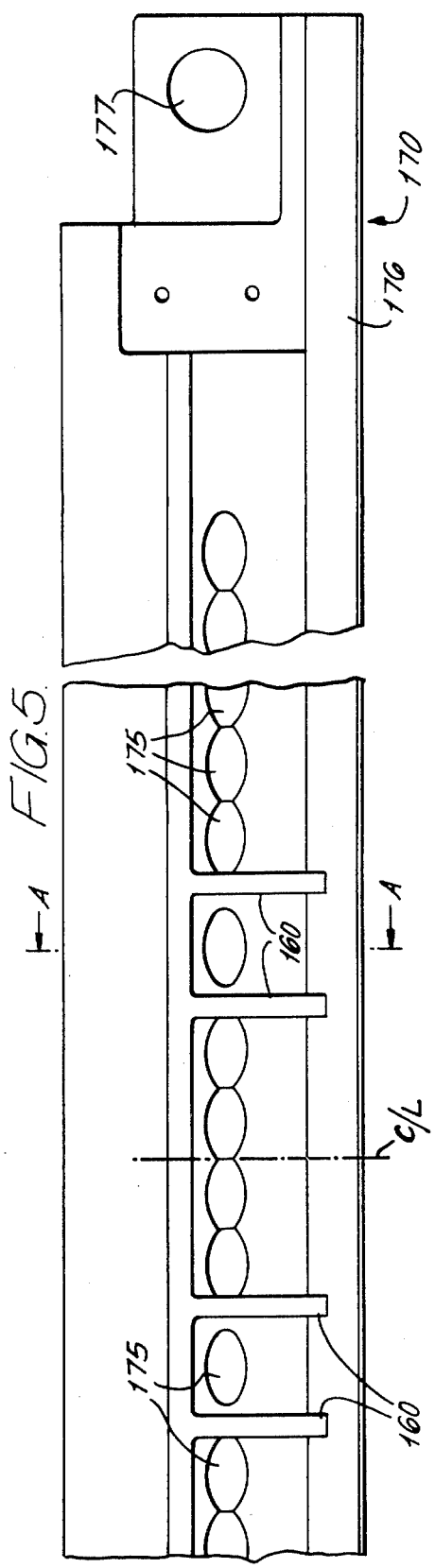
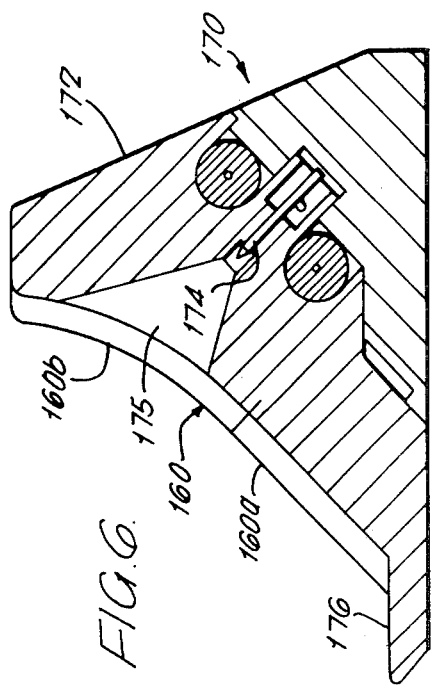

AUTOMATIC DOCUMENT HANDLING APPARATUS

BACKGROUND OF THE DISCLOSURE

1. Field Of The Invention

This invention relates to document handling apparatus particularly for use in copying machines. More particularly, the invention is concerned with such apparatus in which sheets are automatically moved in sequence into a registered position on a work surface and then moved out of that position to make way for the next sheet.

2. Description Of The Prior Art

Quick and accurate movement of documents to a registered predetermined location and removal of these documents is important in the processing of sheet material as for example in the environment of a copying machine. Thus, in a copying machine, an automatic document handler should not only rapidly move the document onto a platen, but must accurately register that document in a specific predetermined copying position or area to assure the production of a complete and visually acceptable copy. If the document is situated on the platen in a skewed or misaligned position within the area, the copy will reflect this same skew or misalignment and may be incomplete and/or unacceptable to the user. If the original is wrinkled, torn or creased it may not produce good copies and will not be acceptable to the user for a great number of reasons, not the least of which may be unsuitability for subsequent use in a machine or automated processor. Moreover, the automated handler must be able to perform these functions efficiently with a maximum range of paper or material weights as documents copied may vary from light weights such as what is known as "onion skin" in the order of 50 grams per square meter to much heavier weights in the order of 120 grams per square meter.

In order to reduce the incidence of skew it has previously been proposed to register the document against a stop, the document being driven over the platen surface by a belt drive. Particularly good results have been achieved by apparatus as proposed in copending Application Ser. No. 687,062, filed May 17, 1976 now U.S. Pat. No. 4,076,233, and assigned to the same assignee as the present application, in which the belt is narrow relative to the surface and is generally centrally located over the surface whereby in operation the belt engages a generally centrally located portion of a document to move the latter over the surface.

One way of registering a document is to feed the document onto the platen surface and then reverse the document against a stop at the inlet end of the platen surface. This is particularly convenient where the document is ejected at the opposite end of the platen since the stop can readily be arranged so as not to interfere with the document as it is fed onto the platen and thus the stop need not be retractable.

For maximum efficiency the document belt desirably picks up and feeds the next document while it is ejecting the previous document. When the belt direction is reversed it can sometimes happen, e.g. due to high humidity conditions, that the previous document has not been fully ejected. The result of this is that this partially ejected document is fed back onto the platen during belt reversal.

SUMMARY OF THE INVENTION

It is an object of the present invention to alleviate the above problems and to this end the invention consists in, from one aspect, a document handling apparatus including a document driving belt extending across a work suface between first and second edges of the surface over which edges, in operation of the apparatus, documents are respectively fed onto and ejected from the surface, means for selectively driving the belt in one direction towards the second surface edge for advancing a document across the surface and in the opposite direction for positioning a document on the surface against a registration edge at said first surface edge, and document drive means adjacent said second surface edge arranged to be driven with the belt in the document advancing direction only and act on a document in contact therewith to prevent it being driven by the belt as the belt is driven in the opposite direction.

With this arrangement a partially ejected document will not be drawn back onto the work surface and can be fully ejected during the following document advancing movement of the belt.

The document driving belt is conveniently endless and passes over belt-support rollers at the registration and eject edges respectively of the surface, the document drive means comprising rollers mounted on opposite sides of the belt-supporting roller at the eject edge coaxially with the latter and driven off it through one way drives.

The document drive rollers are conveniently rubber-tyred and preferably have a slightly greater diameter than the adjacent belt-supporting roller plus belt.

From another aspect, the invention consists in a document handling apparatus including a document driving belt extending across a surface between first and second edges thereof, means for selectively driving the belt in one direction towards the second surface edge and in the opposite direction, a pair of document driving rotary members flanking the belt adjacent the second edge of the surface, and means for driving said members in said one direction only.

BRIEF DESCRIPTION OF THE DRAWINGS

In order that the invention may be more readily understood, reference will now be made to the accompanying drawings, in which;

FIG. 5 is a partial top view of an anti-static bar provided at the eject edge of the platen; and FIG. 6 is a section along the line A—A of FIG. 5.

DESCRIPTION OF THE PREFERRED EMBODIMENTS

Figure 1:
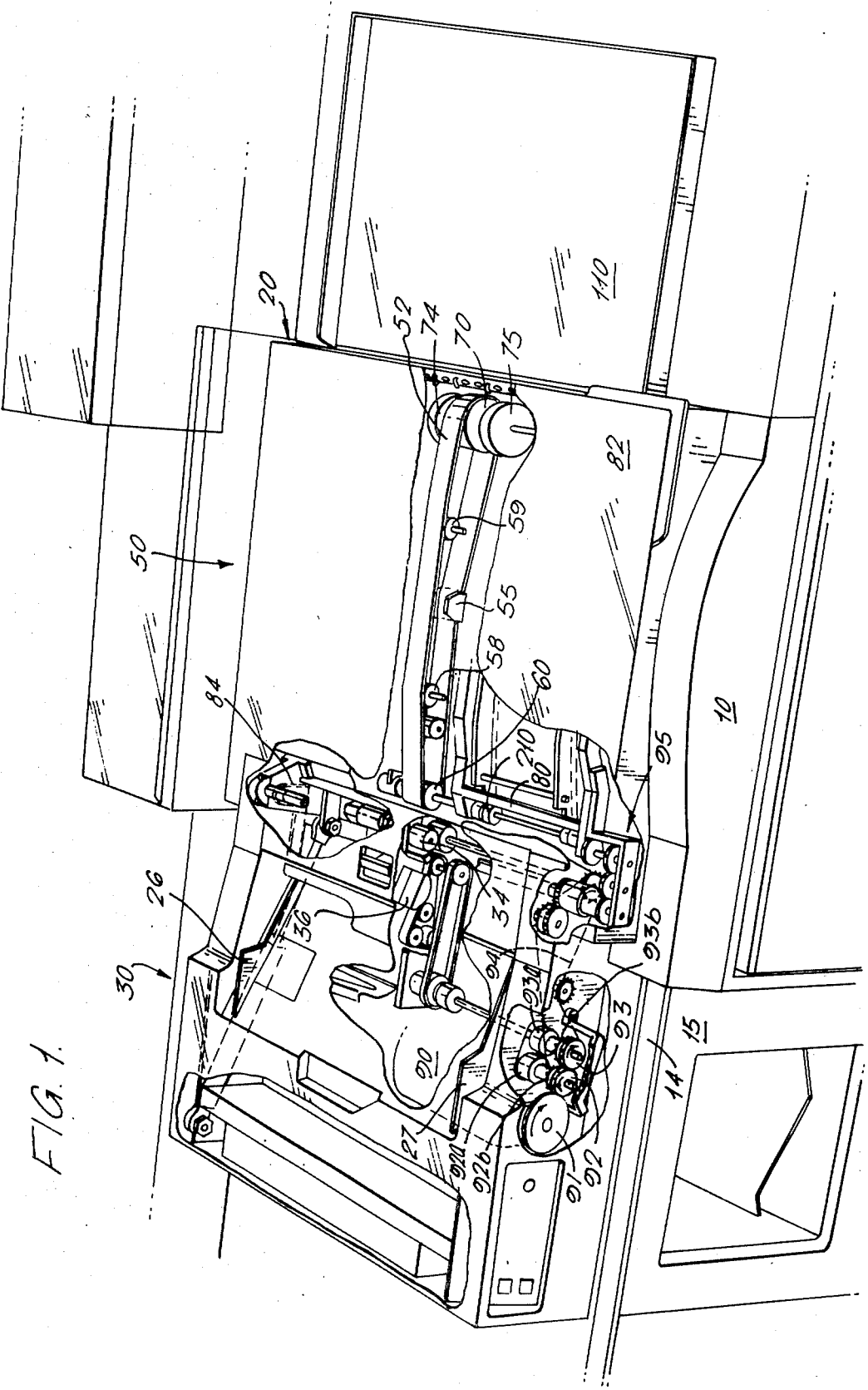
FIG. 1 is a perspective view of a document handling apparatus in accordance with this invention in position on the platen of an electrostatographic copier with parts of the apparatus broken away to show greater detail.
Figure 2:
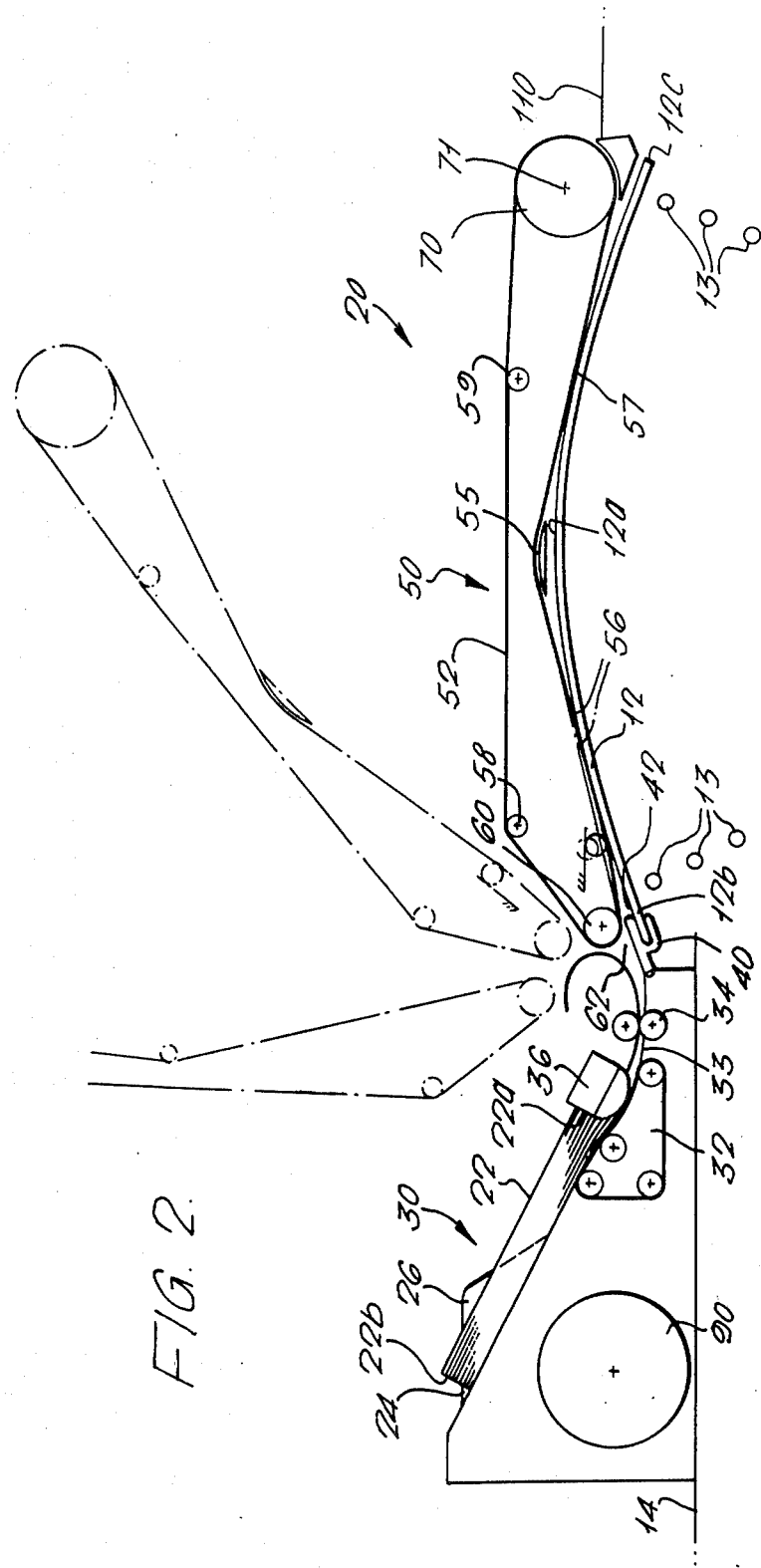
FIG. 2 is a schematic cross-section of the apparatus of FIG. 1.

Referring to FIGS. 1 and 2 of the drawings there is shown a portion of an automatic electrostatic reproduction machine 10 of the kind disclosed for example in U.S. Pat. No. 3,301,126 including a document handling apparatus 20 in accordance with the invention. The document handler 20 overlies a work station comprising an exposure area or platen 12 of the machine 10 and extends over an upper surface 14 of a document output or sorter extension 15 of the machine. The document handler 20 is synchronized with the control of the machine 10 automatically to feed seriatim documents to be copied to the platen 12, register each document and hold it in position on the platen until a selected number of copies has been produced by the machine 10 and then remove it from the platen while feeding the next document to be copied. One method of producing the copies by the machine 10 will be understood for example by reference to the above mentioned U.S. Pat. No. 3,301,126 from which it will be seen that the platen 12 is illuminated from below as suggested by the lamps 13 in FIG. 2 and the image on an upper surface 12a of the platen reflected on to a photoconductive surface (not shown) where the image is developed and from which it is transferred to a suitable substrate to produce the copy.

Document handler 20 generally comprises a sheet material feeder 30 and a document transport 50. The feeder 30 includes a supply tray 24 for cut-sheet documents, and a sheet separator mechanism 32 and a pair of advancing or pinch rolls 34 by which the documents are fed one at a time from a stack of documents in the tray 24 to the document transport 50.

For specific details of an embodiment of a sheet separator 32 which has been found to perform particularly well in this environment reference may be made to copending U.S. Application Ser. No. 687,058, filed on May 17, 1976, now abandoned, and assigned to the same assignee as the present application.

In operation, documents 22 which may be ordinary cut sheets of paper having generally parallel and straight forward and rear edges 22a, 22b respectively, are placed face down for copying in the inclined tray 24 so that the forward edge 22a of the documents will be held normal to the direction of document travel by a suitable restraining member 36.

The alignment of documents by the document feeder 30 relative to the exposure station 12 is preferably such that the center line of the documents remains at generally the same position regardless of the width of the document. This alignment is provided in this embodiment by a pair of self-centering side guides 26 and 27 on opposite sides of the supply tray 24 which restrain the side edges of the documents generally parallel to the direction of feed and feed documents from a central area of the stack or pile regardless of the width of the stack.

With the documents in place and the processor 10 set to make the required number of copies of each document 22, automatic operation is initiated by activation of the "start-print" control of the processor 10.

From its position on the bottom of the document pile in tray 24 the first document is separated from the remainder of the stack by the separator 32 and fed forward over a guide 33 so that its forward edge 22a enters the nip of the driven pinch rolls 34 which latter pull the document 22 completely from the tray and move its forward edge 22a over a registration member 40 and under the control of the transport 50.

The document transport 50 comprises an endless belt 52 riding over and extending between rollers 60 and 70. The belt 52 is driven via the roller 60 which may be rotated in two directions. Anti-clockwise rotation of roller 60 drives the belt "forwards" to advance a document across the platen 12. Clockwise rotation "reverses" the belt for registering the rear edge of a document against the registration member 40. The rollers 60 and 70 rotate on shafts 61 and 71 respectively which are mounted to a movable frame 80 located centrally along opposite sides 12b and 12c of the platen upper surface 12a so that the belt entrained thereover extends across the central portion of the platen or processing station 12. The belt itself is narrow relative to the platen as proposed in copending U.S. Application Ser. No. 687,062, filed May 17, 1976, now U.S. Pat. No. 4,076,233, and assigned to the same assignee as the present application. The frame 80 supports a suitable outer cover 82 which hides the moving parts and prevents light from entering the platen 12.

Advantageously the roller 60 is of small diameter (e.g., 1.5 inches) so that a nip 62 between the belt 52 entrained thereover and the platen surface 12a may be as close as necessary to the edge 12b of the platen and to the paper feeder 30. The belt 52 rests on the platen surface 12a and is made of a material such as silicon rubber on a flexible backing and is preferably white on its outer surface and has a high coefficient of friction with paper type materials, e.g., 0.9. The platen surface 12a will usually be smooth glass so that its coefficient of friction with the paper or belt is relatively low e.g., less than 0.4 Consequently, a document in the form of a material with a relatively high coefficient of friction such as paper for example, will be effectively gripped by the belt 52 on its upper side when it is fed into the nip 62 and caused to slide over the surface 12a on its lower side under the control of the belt 52.

A schematic illustration of how the transport 50 moves out of position to allow access to the platen area 12 for manual use or cleaning is set forth by the dotted lines in FIG. 2 which show the mechanism in a generally half open position and also in a fully open position. As may be understood from FIG. 1 the frame means 80 pivots about an axis 84 that is spaced above the platen 12 to allow full opening extending the frame 80 upwardly about ninety degrees.

A hitch 55 from the belt 52 is positioned on the outside of the belt 52 to support the belt above the platen 12 at an intermediate point between the rollers 60, 70 so that the belt contacts the platen surface 12 at two separated contact areas 56, 57 spaced along its length, i.e., in the direction of travel of the belt. Preferably, as shown, the intermediate point is generally halfway between the rollers.

Idler rollers such as shown at 58, 59 may be provided as required at other positions along the length of the belt means 52. These may be positioned to adjust belt tension.

Further details of hitch 55 are given in copending U.S. Application Ser. No. 687,062, filed May 17, 1976, now U.S. Pat. No. 4,076,233, and assigned to the same assignee as the present application.

Registration member 40 functions to align documents in a predetermined relationship and extends along platen edge 12b. Member 40 is arranged so that documents being fed toward the platen 12 in a first direction pass smoothly thereover; however, it includes an edge 42 raised above the surface 12a so that once a document has passed thereover and is moved in reverse direction, a trailing edge 22b of the document held against the surface 12a will abut thereagainst. Registration member 40 is preferably in the form of a generally channel-shaped plastics clip which fits over the edge of the platen glass 12 as described more fully in copending Application Ser. No. 780,890, filed concurrently herewith, entitled "Document Handling", and assigned to the same assignee as this application. A baffle member 200 may be provided, as set out in copending Application Ser. No. 687,059, filed May 17, 1976, now U.S. Pat. No. 4,043,550, and assigned to the same assignee as the present application, to assure proper abutment of the document edge against the registration surface 42. As is known from U.K. Pat. No. 1,122,626 suitable indicia may be provided on the registration member to allow manual alignment of documents when the machine is being used in a manual By using a narrow belt 52 with crowned rollers 60, 70 construction is greatly simplified in that no side guides are required and tracking problems are greatly reduced compared with a wide belt. We have found that a narrow belt of greater than a 35-1 length to width ratio tracks very well without any guides and does not tend to cause the document to skew.

Operating the belt 52 in a stable condition on crowned pulleys or rollers 60, 70 without edge guides eliminates belt edge wear and possible detracking which may occur under unstable conditions. Accordingly, maintenance is minimized. The roller 60 may advantageously be rubber typed to improve traction.

Ejection of documents from the platen 12 is initiated by the belt 52. However, the final push on to an output tray 110 is assisted by a pair of ejection rollers 74, 75 which are coaxial with the second roller 70. The pair of ejection rollers avoid skewing the document during ejection to provide a neat readily collectable output.

As will be understood from the foregoing, a document on the platen is ejected during a forward motion of the belt 52 which also serves to feed the next document onto the platen. Reversal of the belt drive is used to effect registration of this next document. If, however, as may sometimes happen, e.g., due to high humidity conditions, the previous document has not been fully ejected it will be fed back onto the platen during belt reversal and may interfere with the copying process. In order to avoid this happening, the eject rollers 74, 75 can only rotate in the eject direction. For this purpose the rollers 74, 75 are driven off the roller 70 through one-way drive mechanisms 150 such as sprags or "fibertrans" clutches. By preventing reverse rotation of the rollers 74, 75 the rollers act, during belt reversal, to prevent reverse movement of the document beneath them by reason of their frictional engagement with the document. For this purpose the rollers 74, 75 preferably have tyres 74a, 75a of rubber or other friction material. Further, the rollers 74, 75 are suitably of slightly greater diameter than the belt roller 70 plus the belt 52, so as to increase slightly the velocity of the document during ejection.

Documents being fed are urged against the rollers 74, 75 in a curved path by pairs of stationary curved guide fins 160. The fins are as shown arranged so that there is no direct contact between the fins and the rollers 74, 75 (or the belt 52). A coupling force is maintained by virtue of the beam strength imparted to the flexible, e.g., paper, document, which is curved in its direction of movement by the fins 160. The fins 160 also tend to corrugate in the paper in the lateral direction since the guide surfaces formed by the fins are arranged flush with or slightly radially inwardly of the peripheral surfaces of the associated rollers 74, 75. In one specific embodiment in which each roller 74, 75 is 2.5 inches in diameter, the guide surfaces of fins 160 are flush with the peripheries of the associated roller and the fins are spaced 0.15 inch laterally from the associated roller 74, 75.

In the embodiment illustrated, the fins 160 located between the belt 52 and the rollers may also act to guide the sheet against the belt passing over the roller 70.

With the arrangement described above the rollers 74, 75 and more particularly the belt 52 passing over roller 70 are not engaged by any friction means in the absence of a document and are, therefore, not subject to unnecessary wear.

Figure 3:
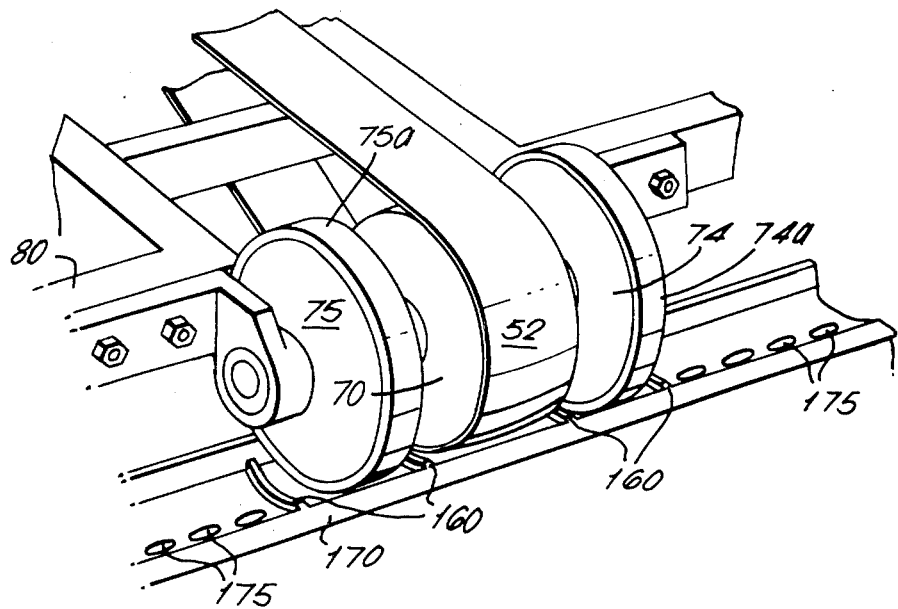
FIG. 3 is a perspective view of the document eject drive.
Figure 4:
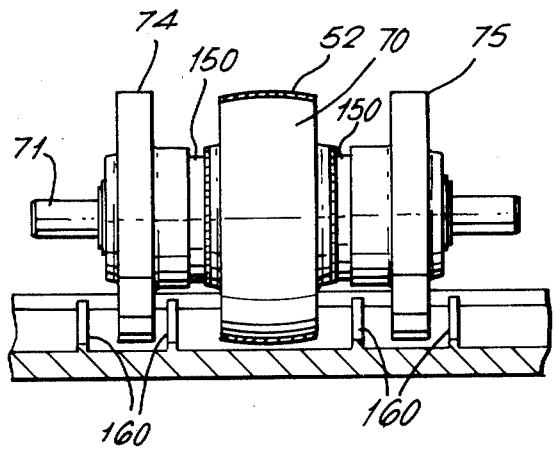
FIG. 4 is a schematic end view, partly in section, of the drive of FIG. 3.

In a preferred embodiment as illustrated in FIGS. 3, 5 and 6 in particular the fins 160 are formed integrally with the plastics body 172 of a corona discharge device 170. The device 170 is provided on the eject side of the platen 12 to neutralize any electrostatic charges in the documents which might impair subsequent handling of the documents. The device 170 is a so-called pin-type antistatic bar having a series of spaced pins 174 projecting through apertures 175 in the body moulding. The device is connected to a suitable source of high tension supply.

As seen in FIG. 6 the fins 160 do not faithfully follow the curvature of the rollers 74, 75 throughout their length but rather include a straight lead-in portion 160a generally at a tangent to the curved portion 160b. The body is also provided with a guide foot 176 and holes 177 for fixing screws. The body is formed of an insulating plastic material such as Noryl (trademark) and may comprise two separate mouldings as seen in FIG. 6.

Power to drive the paper feeder 30 and the belt transport 50 is supplied by a motor 90 which may advantageously be located under the document tray 24. Rotary motion is transmitted from the motor drive gear 91 to a pair of counter rotating gears 92, 93 which in turn are each connected via clutches 92a, 93a to chain drive sprockets 92b, 93b respectively whereby alternate engagement of the clutches will transmit counter-clockwise or clockwise rotation respectively to a chain drive 94. A clutch surface between the gears 92, 93 and sprockets 92b, 93b, is engaged or disengaged by a clutch which is electrically energized in response to machine control logic. The chain drive 94 in turn causes the pinch rolls to drive intermittently and a series of interconnected gears generally indicated at 95 alternately to drive axis 61 and the first roller 60 in opposite first and second directions.

In operation, as the sheet feeder 30 begins to separate and feed a document 22, the platen baffle 200 is raised to open a document entrance gap below it and above the registration member 40 so that documents advanced by the pinch rolls 34 will enter the gap. When the pinch rolls 34 pass the forward or leading edge 22a of a document toward the nip 62 of the document transport 50 a sensing switch located between them is tripped which causes a trailing edge 22b of the document to be detected after which by a small delay the baffle 200 is caused to close against member 40 and the belt 52 is caused to reverse to the second direction. The reverse movement of the belt is timed to allow the trailing edge to abut the registration surface 42 and cause the belt 52 to slip over it briefly to assure full registration and correction of any skew.

Closure of the baffle 200 against the registration member 40 prevents movement of the trailing edge 22b over the registration edge 42 and minimizes the opportunity of the document 22 to buckle. In practice paper weights in a limited range of 47 to 120 grams per square meter have been very successfully handled giving rise to the belief that a much greater range may be accommodated.

Accurate registration of the document 22 on the exposure surface 12 is essential in that the relationship between a document to be copied, the mechanism by which it is to be copied and the material onto which it is to be copied are very precisely predetermined so that if registration is off the copy will not, in most cases of 1:1 copying onto document sized paper, include all of the original document. Even where document margins are such that essential information would not be lost as a result of misregistration nevertheless the aesthetics and integrity of copy would be severly reduced in the eyes of a reader.

After the document has been registered the predetermined number of copies are made and the logic control activates the document handler 20 to eject the copied document and forward the next document for registration and copying in similar fashion. This continues until a sensing switch (not shown) in the tray 24 detects the absence of documents and automatically stops the apparatus.

Although a preferred embodiment of the invention has been described it will be understood that various modifications may be made without departing from the scope of the claims. For example, two or more parallel narrow belts may be used in place of the single belt described.

While the preferred embodiment described has included a curved platen it will be understood that a flat platen or other processing station configuration may be used instead. Moreover, it will be understood that the terms — "platen" and exposure area" are intended to include any work station where a sheet of material is to be positioned so far as practical in a predetermined place. Thus, generally it matters not for what reason the sheet material is so positioned or the specific act performed upon it. For example, the "exposure" may include electronic scanning or magnetic read off.

I claim:

1. A document handling apparatus comprising
   a document driving belt extending across a work surface between first and second edges of the surface over which edges the documents are respectively fed onto and ejected from the surface;
   means for selectively driving the belt in one direction towards the second surface edge for advancing a document across the surface and in the opposite direction for positioning a document on the surface against a registration edge at said first surface edge;
   document drive means adjacent said second surface edge located laterally of said document driving belt and arranged to be driven with the belt in the document advancing direction only and act on a document in contact therewith to prevent the document from being driven by the belt as the belt is driven in the opposite direction, wherein said document drive means comprises a pair of rotary members flanking the belt adjacent the second edge of the surface, wherein said document driving belt is an endless belt passing over first and second belt-supporting rollers at said edges of the surface respectively and the rotary members comprise rollers mounted coaxially with the second belt-supporting roller;
   a pair of stationary curved guide surfaces at opposite sides of said rotary members and said second belt supporting roller and spaced therefrom, said guide surfaces being arranged to urge a sheet against the periphery of said rotary members and said second-belt supporting roller in a curved path.

2. Apparatus according to claim 1 wherein said rotary members are driven off the second belt-supporting roller through one-way drives.

3. Apparatus according to claim 2 wherein the peripheral surfaces of the document driving rollers are of resilient material.

4. Apparatus according to claim 1 wherein the document driving rollers have a slightly greater diameter than the second belt supporting roller plus the belt.

5. Apparatus according to claim 1 including a corona discharge device arranged along the second surface edge, the discharge device having a casing carrying curved fins forming said guide surfaces.

* * * * *